United States Patent [19]

Satoh et al.

[11] Patent Number: 5,572,503
[45] Date of Patent: Nov. 5, 1996

[54] CORRECTING NON-LINEAR DISTORTIONS OF OPTICAL INFORMATION WITH A NON-LINEAR EQUALIZER

[75] Inventors: Naoki Satoh, Odawara; Takeshi Maeda, Kokubunji; Atsushi Saito, Ichikawa; Hisataka Sugiyama; Hirofumi Sukeda, both of Kodaira; Hiroyuki Tsuchinaga, Kokubunji; Yasuhide Ouchi, Odawara, all of Japan

[73] Assignee: Hitachi, Ltd., Tokyo, Japan

[21] Appl. No.: 358,584

[22] Filed: Dec. 13, 1994

[30] Foreign Application Priority Data

Dec. 15, 1993 [JP] Japan .................................. 5-314708

[51] Int. Cl.$^6$ ........................................... G11B 7/00
[52] U.S. Cl. ...................... 369/124; 369/107; 369/275.3; 375/233
[58] Field of Search ........................... 369/116, 107, 369/124, 275.3; 375/233, 232, 229, 230, 231; 364/724.19, 724.16, 724.2

[56] References Cited

U.S. PATENT DOCUMENTS

| | | | |
|---|---|---|---|
| 4,315,319 | 2/1982 | White | 364/571 |
| 4,468,786 | 8/1984 | Davis | 375/231 |
| 4,870,657 | 9/1989 | Bergmans et al. | 375/233 |
| 5,119,401 | 6/1992 | Tsujimoto | 375/233 |
| 5,233,635 | 8/1993 | Henriksson et al. | 375/233 |
| 5,400,189 | 3/1995 | Sato et al. | 360/65 |
| 5,418,770 | 5/1995 | Ide et al. | 369/116 |
| 5,450,390 | 9/1995 | Toda et al. | 369/121 |
| 5,471,504 | 11/1995 | Lee et al. | 375/233 |

OTHER PUBLICATIONS

Yamakoshi, Effect of Head to Medium Spacing on Non-Linear Bit Shifts, Institute of Electronics, Information and Communication Engineers of Japan, 1992, Autumn Meeting Lecture Papers, vol. 5, p. 35.

Fisher, An Adaptive RAM–DFE for Storage Channels, IEEE Transaction of Communication, vol. 39, No. 11 (Nov. 1991), pp. 1559–1568.

"Application of Digital Signal Processing", pp. 169–170, Institute of Electronics, Information and Communication Engineers of Japan.

*Primary Examiner*—Georgia Y. Epps
*Assistant Examiner*—Kim-Kwok Chu
*Attorney, Agent, or Firm*—Antonelli, Terry, Stout & Kraus

[57] ABSTRACT

An optical disk device which uses a light spot for reproducing data, including photodetector, a decoder, and a non-linear equalizer provided between the photodetector and the decoder for correcting non-linear distortions in a reproduced signal from an optical disk. The non-linear equalizer includes a linear equalizer and a decision feedback equalizer provided after the linear equalizer. The non-linear equalizer includes a detector for detecting a signal on the basis of the output of the linear equalizer with the output of the detector being input to the decision feedback equalizer, the output of which is input to the detector along with the output of the linear equalizer in an additive manner.

13 Claims, 10 Drawing Sheets

CORRECTING NON-LINEAR DISTORTIONS OF OPTICAL INFORMATION WITH A NON-LINEAR EQUALIZER

BACKGROUND AND SUMMARY OF THE INVENTION

The present invention relates to signal reproducing methods using optical disk devices, optical disk devices which well eliminate non-linear distortions which can be generated in the recording/reproducing system thereof, signal processors of the optical disk devices and optical disk mediums.

FIG. 6 shows the basic structure of a recording/reproducing system of an optical disk device. User data 26 from a host device such as a controller 19 is converted through an encode/decode circuit 17 to a data row 27 of bits "1" and "0". A modulation system, for example, a 1–7 modulation system, converts user data 26 of two bits to a data row 27 of 3 bits, so that the interval of time T (sec) of a data row to be recorded is ⅔ (which is equal to the modulation rate) of the interval of time involving the user data 26. The modulated data row 27 includes 1–7 successive bits "0" and is then converted by a write current driver 16 to a data row 28 which does not change at a bit "0", but changes at a bit "1" alone. This data row 28 drives a laser source 38 such that a laser optical pulse is irradiated on an optical disk 22 in the recording process. When the laser power of the data row 28 is large, the laser pulse is recorded as a mark 11 on the disk 22 (that is, mark edge recording). An optical head 21 which has the laser source 38 and an optical system to irradiate a laser beam onto the optical disk is movable over the optical disk 22.

In reproduction, a photodetector 39 detects a light returning from the disk 22 to produce a detection signal 29, on the basis of which a read signal processor 68 forms a reproduced data row 7. The encode/decode circuit 17 decodes the data row 7 to the user data 26. In FIG. 7, reference numeral 72 denotes a bit cycle and 71, a determining level used to form the reproduced data row 7 by detection of an edge of the mark.

FIG. 7 shows the concept of the mark on the disk 22. The leading edge of the recorded mark 11 shifts especially under the influence of heat produced by the directly preceding recorded mark. This is called edge shift.

FIG. 8 shows the relationship between an edge shift quantity Le (m) and the length of the number of bits, B0, (bits) between adjacent marks. When B0 is small, a very large edge shift quantity Le (m) appears. Such a non-linear distortion in the recording process would be generated likewise when an opto-magnetic disk is used as a recording medium.

Conventionally, in order to prevent the generation of non-linear distortions in the recording process, a method of correcting and recording the edge position by assuming beforehand that a mark will shift, and a method of reducing the influence of heat on the next mark by rendering the laser power intermittent at the rear portion of the mark have been used. However, in those methods, the current fed to the laser is required to be controlled at very high speed with high accuracy. This renders the write current driver 16 complicated and would not provide sufficient performance due to fluctuations of the temperature of the device/disks, disadvantageously (non-linear distortions in the recording process).

FIG. 9 illustrates the principle of detecting recorded marks 11, 11' by applying optical spots 10, 10', 10" to the recorded marks 11, 11'. Reference numeral 73 denotes a reflected light detection signal corresponding to the mark 11; 73', that corresponding to the mark 11'; 75, that corresponding to the sum of marks (11+11'). Although reference numeral 74 denotes linear summation of signals 73, 73', but does not coincide with the actual signal 75. As just described above, since the actual reproduced waveform 75 does not coincide with the waveform 74 obtained by linear superposition of marks in the optical spots in the reproduction methods of detecting the edges of the marks 11, 11' from the signals 73 and 73', an accurate signal cannot be reproduced. This is because the relationship between the mark area and the intensity of the reflected light is not linear. This non-linearity cannot be corrected only by the linear equalizer included in the read signal processor 68 of FIG. 6—This is a problem of non-linear distortion involved in the reproduction of data in the optical disk.

This distortion also occurs likewise in an optical disk device dedicated to reproduction. Therefore, for example, even when a mark has been recorded without generation of a non-linear distortion, the generation of a non-linear distortion cannot be avoided in the reproduction when a method of detecting a mark with the intensity of the reflected light of the light spots is used.

It is known that non-linear distortions which can be produced in the recording process by the magnetic disk device are determined by the magnetic characteristic of a magnetic disk, the spacing between the magnetic disk and the recording head and the intensity of the recording magnetic field, and that the non-linear distortion is influenced by data preceding a bit to be recorded by one or two bits, which is disclosed on Institute of Electronics, Information and Communication Engineers of Japan, 1992, autumn meeting lecture papers, Vol. 5, page 35. According to this paper, a magnetic disk device, non-linear distortions in the recording process can be eliminated relatively easily by adjusting the position of a bit to be recorded on the basis of data preceding the bit to be recorded by one or two bits. Basically, any non-linear distortions are not produced in the reproducing process.

In such magnetic disk devices, application of a decision feedback equalizer using a random access memory (hereinafter referred to as a RAM-DFE) has been studied, the details of which are disclosed on IEEE Transaction of Communication, Vol. 39, No. 11 (1991), pp. 1559–1568. The object of use of a RAM-DFE in the magnetic disk device is to improve the S/N (signal/noise) ratio at the point of discriminating a reproduced signal by a combination of the RAM-DFE and a linear equalizer such as a traversal equalizer, and not to reduce the non-linear distortions basically.

It is an object of the present invention to provide an optical disk device which equalizes non-linear distortions, which may be generated in an optical disk device in recording and reproducing processes, such as those mentioned above, with high accuracy and at high efficiency, and an optical disk medium suitable for use with the optical disk device.

In order to achieve the above object in the present invention, an optical disk device which uses a light spot for recording and reproducing data includes non-linear equalizing means provided between photodetection means and decoding means to correct possible non-linear distortions generated in recording and reproducing the data to and from the optical disk.

In an optical disk device dedicated to reproduction, using a light spot for reproduction of data, non-linear equalizing means is provided between photodetection means and decoding means to correct possible non-linear distortions generated in the reproduction of data from the optical disk.

The non-linear equalizing means may include a decision feedback equalizer.

The non-linear equalizing means may include linearly equalizing means.

The optical disk device having the non-linear equalizing means may include learning control means for learning the equalizing characteristic of the non-linear equalizing means.

The linearly equalizing means may include a transversal equalizer which operates at a symbol rate. The number of taps Nf of the transversal equalizer may be:

$$Nf \geq (1 + \text{the minimum number of successive bit "0's" determined by a modulation system})/2 + \text{a reproduced spot diameter of a laser beam}/\text{a minimum bit length determined by a modulation system}/2 \; (Nf \text{ is a positive integer})$$

The register length Nb of the decision feedback equalizer may be:

$$Nb \geq \text{the reproduced spot diameter}/\text{the shortest bit length determined by the modulation system} \; (Nb \text{ is a positive integer}).$$

At this time, the reproduced spot diameter may be defined at a position where the light strength distribution on the optical disk surface becomes 1/e of the central light intensity of the optical spot.

The register length Nb of the decision feedback equalizer may be:

$$Nb \geq 1 + \text{the maximum length of the number of bits between adjacent marks determined by the modulation system} \; (Nb \text{ is a positive integer}).$$

In more detail, the number of taps Nf of the transversal equalizer in the optical disk may be:

$$Nf \geq (Bm+1)/2 + (0.82 \, L\lambda/Na)/(2\pi \times D \times d \times 0.0254 \times N \times \text{Rate}/Bps/8) \; (Nf \text{ is a positive integer})$$

where N (rps) is the disk rotational speed, D is the disk size (diameter) (inches), Bps (bytes/sec) is the data transfer rate; Lλ (m) is the laser wavelength used for reproduction; Na is the aperture number of an objective of the optical system; d is the data area ratio of a disk (d=the innermost peripheral track position/outermost peripheral track position); Bm (bits) is the minimum number of "0's" between adjacent marks in the modulation system; and Rate is the modulation rate.

The length Nb of the decision feedback equalizer may be:

$$Nb \geq (0.82 \, L\lambda/Na)/(\pi \times D \times d \times 0.0254 \times N \times \text{Rate}/Bps/8) \; (Nf \text{ is a positive integer})$$

where N (rps) is the disk rotational speed, D is the disk size (diameter) (inches), Bps (bytes/sec) is the data transfer rate; Lλ (m) is the laser wavelength used for reproduction; Na is the aperture number of an objective of the optical system; d is the data area ratio of a disk (d=the innermost peripheral track position/outermost peripheral track position); and Rate is the modulation rate in the modulation system.

The register length Nb of the decision feedback equalizer may be:

$$Nb \geq 1 + \text{the maximum length of the number of bits between adjacent marks determined by the modulation system} \; (Nb \text{ is a positive integer}).$$

In the optical disk device, the data transfer rate may be constant through the radius of the optical disk.

The number of tracks through the radius of the optical disk may be divided by an positive integer such that the line recording density may be substantially constant at the respective track positions.

The linearly equalizing means may include means for correcting the linearly equalizing means in an adaptive manner in the reproduction.

The optical disk device may include a mechanism for receiving an optical disk removably.

An optical disk set in the optical disk device may have through the radius of the disk a plurality of learning training tracks to determine the characteristic of such non-linear equalizing means.

A signal processor and a signal processing integrated circuit of the optical disk device including the non-linear equalizing means may include learning control means for learning the equalizing characteristic of the non-linear equalizing means, memory means for storing a target signal used in the learning, and control input terminals for controlling the learning control means and memory means.

In the present invention, in the optical disk device using a light spot for recording/reproducing data, non-liner equalizing means is provided between the optical detecting means and the decoding means. Thus, the circuit, which corrects a recorded mark in the recording process, indispensable for the conventional structure is greatly simplified, so that possible non-linear distortions generated in the recording and reproducing processes in the optical disk are corrected appropriately in the reproducing system.

In the optical disk device dedicated to reproduction, using a light spot for reproduction of data, non-linear equalizing means is provided between the photodetection means and the decoding means. Thus, even when the diameter of the light spot is several times that of the recorded mark, non-linear distortions which can be generated in that case are corrected appropriately.

Provision of the decision feedback equalizer of FIG. 1 using a RAM in the non-linear equalizing means serves to efficiently correct possible non-linear distortions generated in the recording and reproducing processes with a relatively simple circuit structure.

Provision of linearly equalizing means in the non-linear equalizing means serves to improve the quality of a reproduced signal and the accuracy of discrimination.

Provision of learning control means to learn the equalizing characteristic of the non-linear equalizing means in the optical disk device including the non-linear equalizing means appropriately maintains the equalizing characteristic even when the device temperature and characteristic and hence the non-linear distortions change.

When the linearly equalizing means is a transversal equalizer which operates at a symbol rate, and the linearly equalizing means is realized by the transversal equalizer on the basis of the minimum number of successive bits "0" determined by the modulation system, the shortest bit length determined by the modulation system, and the reproduced spot diameter of the laser beam, the minimum number of taps Nf of the transversal equalizer is determined as follows:

FIG. 2 shows the relationship between the shortest mark length Lpmin and the diameter of the reproduced spot of the laser beam.

Let Rs (m) be the diameter of the reproduced spot of the laser beam; let N (rps) be the rotational speed of the optical disk; let R (m) be a radial position on the disk, data from which is to be reproduced; let 1/T (bits/sec) be the data rate at that position after the modulation; and let Bm (bits) be the minimum number of successive bits "0" of the modulation system. Since the line velocity V (m/sec) at the position of the reproduction is:

$$V = 2\pi RN \text{ (m/sec)},$$

the shortest mark length Lpmin (m) determined from the relationship with the modulation system is given by $$Lpmin = (Bm+1) \times VT \text{ (m)}.$$

In FIG. 2, the reproduced signal is present from the time when the reproduced spot 10 starts to sweep a mark 11 to the time when the reproduced spot 10 leaves the mark 11 or to the time when the reproduced spot 10 arrives at the spot 10". The movement range Lspmin (m) of the reproduced spot where the reproduced signal is present is:

$$Lspmin = Lpmin + Rs \text{ (m)}.$$

The transversal equalizer is required to equalize an area Lf which is ½ of the range Lspmin where the reproduced signal is present, as shown in FIG. 2. The signal in the area Lb after the area Lf, inclusive of waveform distortions generated by the transversal equalizer, is equalized by the feedback equalizer. Thus, the number of taps Nf of the transversal equalizer is:

$$Nf \geq Lspmin/(4\pi RNT) = (Lpmin + Rs)/(4\pi RNT) = (Bm+1)/2 + Rs/(4\pi RNT) \text{(taps) (\textit{Nf} is a positive integer)}.$$

Rewriting this result, using the minimum number of successive bits "0" determined by the modulation system, the shortest bit length determined by the modulation system, and the reproduced spot diameter of the laser beam:

$$Nf \geq (1 + \text{the minimum number of successive bits "0"})/2 + \text{a reproduced spot diameter/the shortest bit length}/2 \text{ (\textit{Nf} is a positive integer)}.$$

By this setting, the tap coefficient is set appropriately and an improvement to the S/N ratio at the discriminating point is expected by the effect of the non-linear equalizing means. The number of taps cannot be defined in the reproducing system of the magnetic disk device.

As shown in FIG. 9, the register length Nb of the decision feedback equalizer which removes possible non-linear distortions in the reproduction generated because the relationship between the mark area and the reflected light intensity is non-linear as shown in FIG. 9 is determined as follows:

Now, the trailing edge of the minimum mark is equalized in consideration of the length of the mark which will influence the reproduced spot 10, as shown in FIG. 2. To this end, the required register length Nb of the decision feedback equalizer is given by:

$$Nb \geq Rs/(2\pi RNT) \text{ (Nb is a positive integer)}$$

where Rs (m) is the reproduced spot diameter, and $2\pi RNT$ (m) is the bit length.

That is, if the following conditions are satisfied:

Nb ≧ the reproduced spot diameter/the shortest bit length (Nb is a positive integer), the non-linear distortions in the reproduction are corrected efficiently.

At this time, if the reproduced spot diameter is defined at a position where the light intensity distribution on the optical disk surface is 1/e of the central light intensity of the light spot, device design is achieved which does not depend on various parameters of the optical system.

In order to eliminate a non-linear edge shift quantity Le (m) determined by a recorded mark pattern as shown in FIG. 8, the maximum length Bm (bits) of the number of bits between adjacent marks determined by the modulation system is required to be considered. The register length Nb (taps) of the decision feedback equalizer to correct the non-linear edge shift quantity is:

$$Nb \geq Bm+1 \text{ (taps) (\textit{Nb} is a positive integer)}.$$

That is, if $$Nb \geq 1 + \text{the maximum length of the number of bits between adjacent marks (\textit{Nb} is a positive integer),}$$

possible non-linear distortions generated in the recording process are corrected efficiently. Since the edge shift quantity Le (m) rapidly decreases as the number of bits B0 between adjacent marks increases, it is obvious that the conditions of the Nb are not necessarily required.

In more detail, if the number of taps Nf of the transversal equalizer in the optical disk is:

$$Nf \geq (Bm+1)/2 + (0.82 L\lambda/Na)/(2\pi \times D \times d \times 0.0254 \times N \times \text{Rate}/\text{Bps}/8) \text{ (\textit{Nf} is a positive integer)}$$

where N is the disk rotational speed (rps), D is the disk size (diameter) (inches), Bps (bytes/sec) is the data transfer rate; Lλ (m) is the laser wavelength to be used for reproduction; Na is the aperture number of an objective of the optical system; d is the data area ratio of a disk (d=the innermost peripheral track position/outermost peripheral track position); and Bm (bits) is the minimum number of successive bits "0's" in the modulation system and Rate is the modulation rate, the S/N ratio is improved by setting the tap coefficient at an appropriate value and using the effect of the decision feedback equalizer.

If the length Nb of the decision feedback equalizer is given by the expression below, an optical disk device dedicated to reproduction is constructed in which non-linear distortions in the reproduction process are corrected efficiently:

$$Nb \geq (0.82L\lambda/Na)/(\pi \times D \times d \times 0.0254 \times N \times \text{Rate}/Bps/8) \text{ (\textit{Nf} is a positive integer)}$$

where N is the disk rotational speed (rps), D is the disk size (diameter) (inches), Bps (bytes/sec) is the data transfer rate; Lλ (m) is the laser wavelength to be used for reproduction; Na is the aperture number of an objective of the optical system; d is the data area ratio of a disk (d=the innermost peripheral track position/the outermost peripheral track position); and Rate is the modulation rate in the modulation system.

If the register length Nb of the decision feedback equalizer is:

$$Nb \geq 1 + \text{the maximum length of the number of bits between adjacent marks determined by the modulation } (Nb \text{ is a positive integer}),$$

an optical disk device is constructed in which possible non-distortions generated in the writing process are corrected efficiently and which data is writable additionally and rewritable.

If in the optical disk device the data transfer rate is maintained constant through the radius of the optical disk, device control is further facilitated.

If the number of tracks through the radius of the disk is divided by an positive integer and the line recording density is substantially constant at the respective track positions, the equalizing characteristic of the non-linear equalizing means is shared by many tracks and the capacity of a memory which stores coefficient values determining the equalizing characteristic is reduced.

If the linearly equalizing means includes means for correcting non-linear distortions in an adaptive manner in the reproduction, improved appropriate equalizing characteristic is provided and the S/N ratio at the discriminating point is improved.

If the optical disk device includes a mechanism for receiving an optical disk removably, an optical disk device compatible considerably easily with different optical disks is provided even when fluctuations in the characteristic of the optical disk.

If an optical disk used in the optical disk device has a learning training track to determine the characteristic of a plurality of such non-linear equalizing means through the radius of the optical disk, an appropriate equalizing characteristic is learned each time the disk is set in the disk device. As a result, the storage capacity of the disk is increased.

If a signal processor and a signal processing integrated circuit of the optical disk device having the non-linear equalizing means include learning control means for learning the equalizing characteristic of the non-linear equalizing means, memory means for storing a target signal used in the learning, and control input terminals for controlling the learning control means and the memory means, a target signal always correct is given to the learning control means in the learning process even in the initial equalizing characteristic where errors in the discrimination will occur very frequently. Thus, higher accuracy equalizing characteristic is realized with high convergency and as a result a high reliability optical disk device is constructed.

DESCRIPTION OF THE PREFERRED EMBODIMENTS

Figure 1:
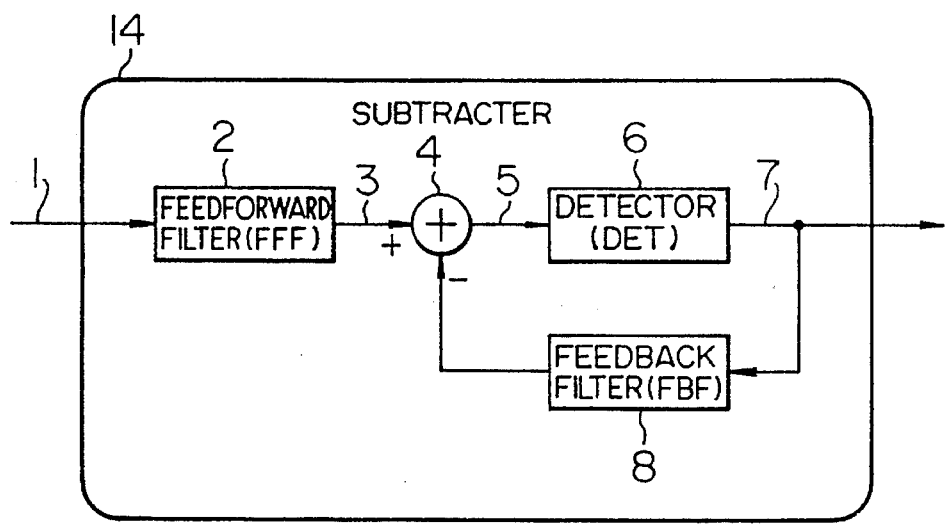
FIG. 1 shows the structure of a decision feedback equalizer (DEF)
Figure 2:
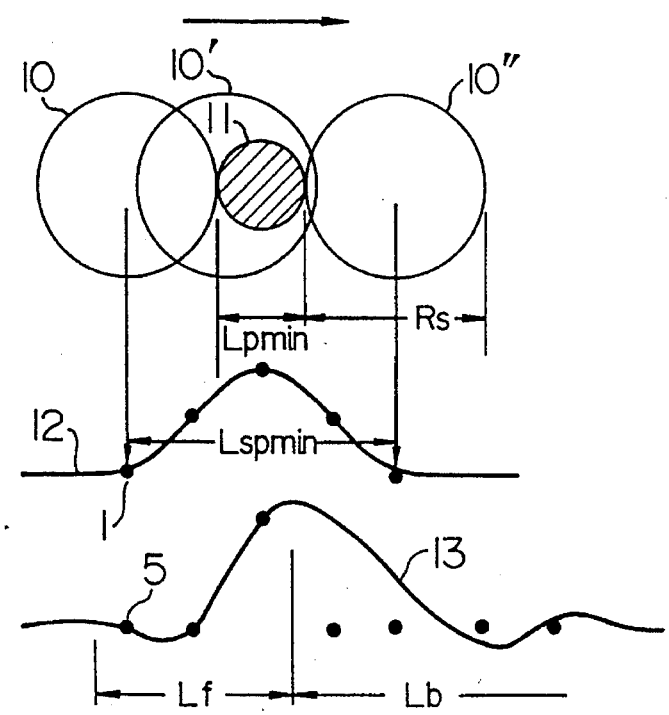
FIG. 2 shows an output waveform from a feedforward filter (FFF) functioning as linear equalizer and an output signal from a photodetector based on the ratio in size of a light spot to a mark.

A first embodiment of the present invention will be described with reference to FIG. 1. This embodiment includes a read signal processor 68 of an optical disk device which operates at a constant transfer rate. The read signal processor 68 includes a decision feedback equalizer 14 (DFE). The DFE 14 includes a linear equalizer or feedforward filter (FFF) 2, a subtracter (SUB) 4, a detector (DET) 6, and a feedback equalizer (FBF) 8.

The present embodiment is composed of an optical head 21 which includes an objective 40, a semiconductor laser 38 and a polarized light beam splitter 41; a focusing control unit 15 which moves a focal position 10 in the directions of double-headed arrow 35 for focusing purposes; a tracking controller 18 which moves the optical head 21 in the directions of double-headed arrow 36; a spindle controller 20 which rotates a disc 22 in the direction of an arrow 37; a write current driver 16 which controls the intensity of a laser beam when a mark 11 is recorded on the disk 22; the read signal processor 68 which receives an output 29 from a photodetector 39 and reads pit data recorded in the disk 22; an encode/decode circuit 17; and a controller 19 which controls the operations of all those elements and inputting/outputting of data 25 from/to the outside.

Figure 3:
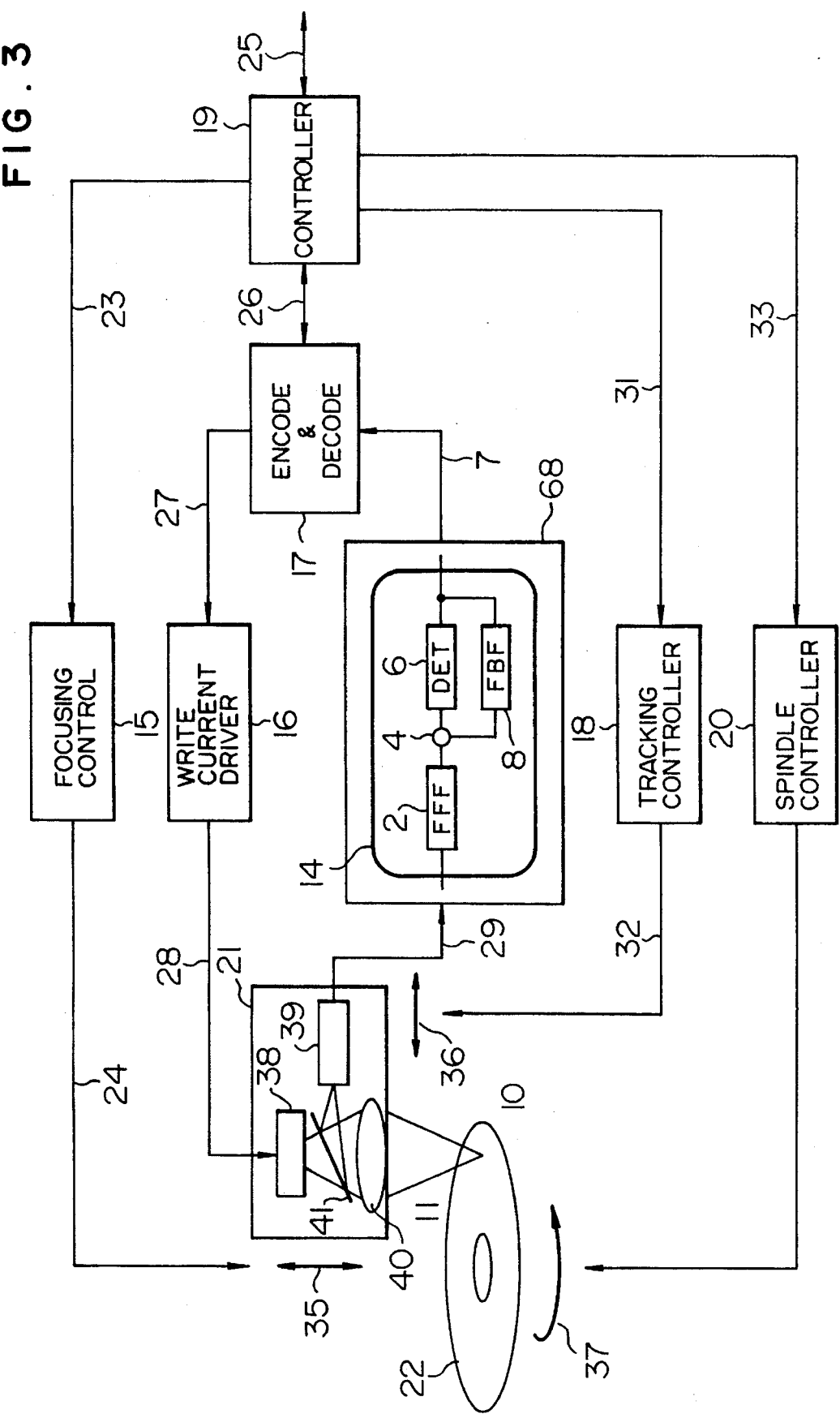
FIG. 3 shows the structure of each of a first and a second embodiment of the present invention.
Figure 13:
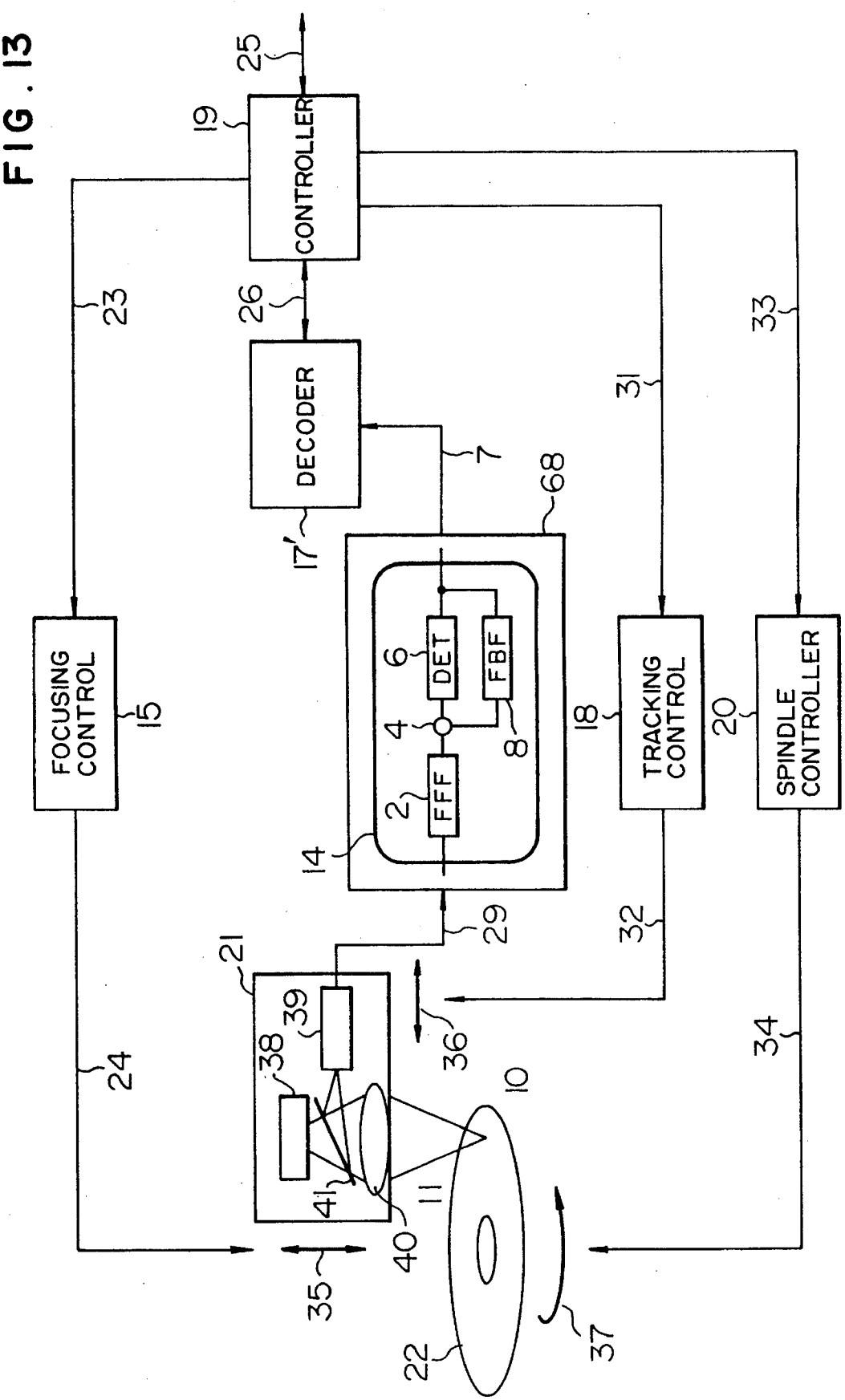
FIG. 13 shows an optical disk device dedicated to reproduction as a modification of the first or second embodiment.

As shown in FIG. 13, an element such as the read signal driver 16 of FIG. 3 is omitted in the embodiment of an optical disk device dedicated to reproduction such as a CD-ROM to which the present invention is applied.

The respective dimensions of the optical disk device are as follows: The disk rotational speed N is 1800 (rpm); the disk size (diameter) D is 3.5 (inches); the modulation system is a (1,7) RLL code (Rate=⅔); the user data transfer rate Bps is 1 (Mbytes/sec); the wavelength Lλ of a laser 38 used for reproduction is 0.72 (μm); the numerical aperture Na of the objective 40 is 0.5; and the data area ratio d of the disk 22 (d=the innermost peripheral track position/the outermost peripheral track position) is 0.5. Rm (); Rs (the diameter of a reproduced spot of the laser); and T (the interval of time involving a data row to be recorded) are calculated as:

$Rm=3.5\times0.5\times0.0254/2\ (m)=2.22\ (cm)$ $Rs=0.82\times0.72/0.5\ (\mu m)=1.181\ (\mu m)$, and $T=2/3/1/8\ (\mu sec)=83.3\ (\mu sec)$.

Thus, the minimum number of taps Nf of FFF 2 is:

$$Nf = INT\{(1+1)/2 + 1.81e(-6)/4\pi \times 2.22e(-2) \times 1800 \times 60 \times 83.3e(-9)) + 1\}(taps) = INT\{1 + 1.694 + 1\} = 3\ (taps).$$

Since Ns and Nh are calculated as:

$Ns=7+1=8\ (taps)$, and $Nh=INT\{1.181e(-6)/(2\ \pi\times2.22e(-2)\times1800/60\times83.3e(-9))+1\}(taps)=INT\{3.39+1\}=4$.

the minimum number of taps Nb of FBF 8 is:

$Nb=Max\ (Ns, Nh)=8\ (taps)$

Generally, as the size of the light spot increases compared to the size of the mark, the number of taps is required to increase to eliminate non-linear distortions. A larger number of taps provides a higher resolution although the structure of the disk device is more complicated.

Figure 14:
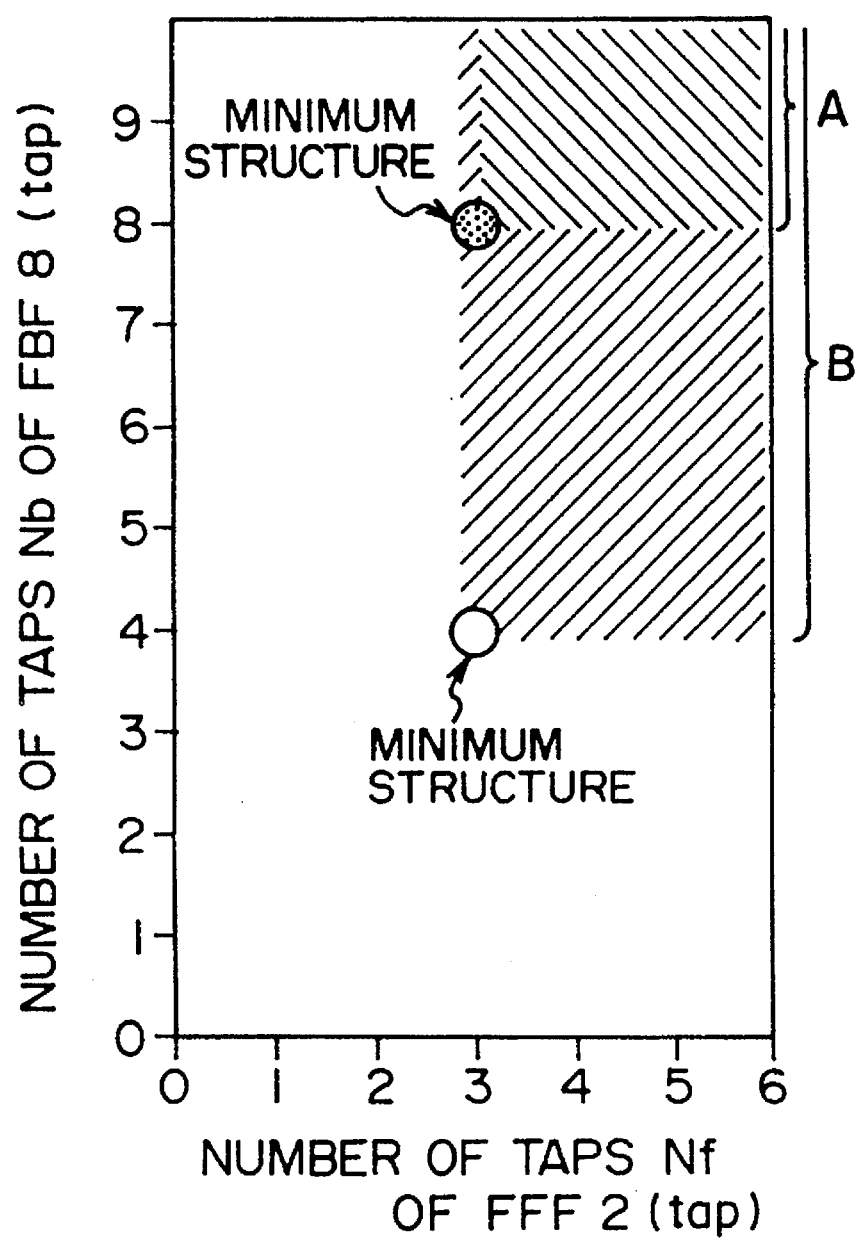
FIG. 14 shows a range of structure scale of a decision feedback equalizer (DFE) of the first and second embodiments.

While in the present embodiment Nb=Ns=8 is employed, Nb=Nh may be reduced to 4 in dependence on the degree of non-linear distortions in the recording process. In the present embodiment, the feedforward filter (FFF) 2 of the decision feedback equalizer (DFE) 14 had three taps and the feedback filter (FBF) 8 had 8 taps. As shown in FIG. 13, Nb=may be employed in the optical disk device dedicated to reproduction such as a CD-ROM since non-linear distortions in the recording process are reduced, as described above. Under such conditions, a read signal processing system of high performance is constructed in the areas of Nf and Nb such is as shown in FIG. 14.

Figure 4:
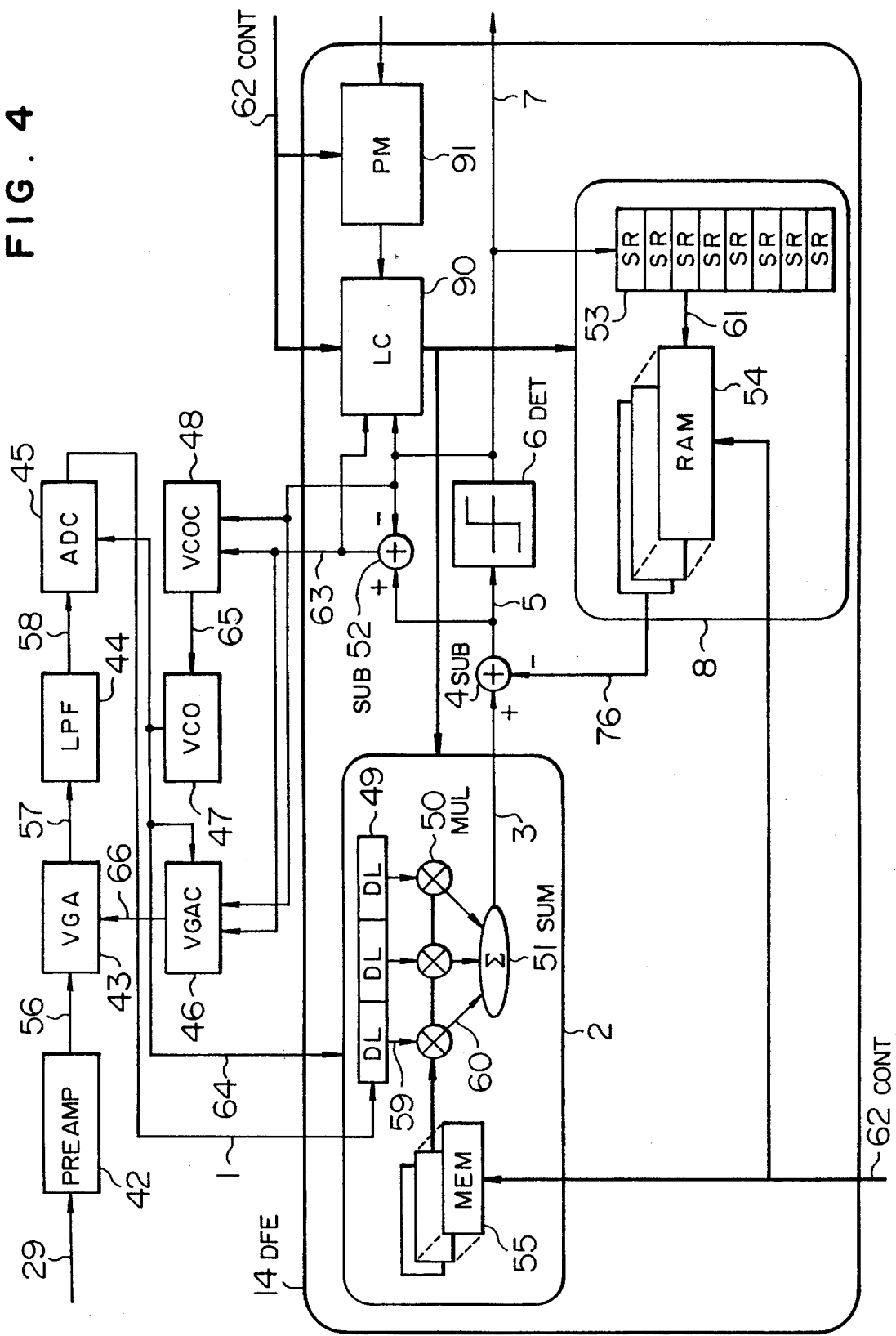
FIG. 4 shows the structure of a read signal processor of the first embodiment.

FIG. 4 shows a specified structure of the read signal processor 68 of the present embodiment. The read signal processing operation of the present embodiment will be described next with reference to FIG. 4.

A signal 29 detected by the photodetector 39 of FIG. 3 is amplified by a preamplifier (PreAMP) 42 into a signal 56, which is then input to a variable gain amplifier (VGA) 43, the output 57 of which is converted through a low pass filter (LPF) 44 by an A/D converter (ADC) 45 to a read digital signal 1, which is then input to the DEF 14.

The reproduced signal 1 is then equalized and identified by the decision feedback equalizer 14 to be a detection output 7 which indicates the presence/absence of a mark with "1"/"0" at each sample time.

In order to avoid misunderstanding, additional description is given: the output of the A/D converter 45 is only a read waveform level represented by a digital code of a predetermined number of figures at each sample time. The DFE 14 provides a detection output indicative of the presence/absence of the mark or so-called pit data. The DFE 14 improves the signal/noise (S/N) ratio of a signal in the feedforward filter (FFF) 2 having three taps and equalizes the leading edge of the waveform of a reproduced mark so as to satisfy the Nyquist conditions.

An error involved in the trailing edge of the reproduced mark waveform and the non-linear distortions generated by the FFF 2 are corrected by RAM 54 and the subtracter 4 on the basis of the contents of the shift register (SR) 53 present before the determination in the FBF 8. The detector (DET) 6 detects whether the output 5 of the subtracter (SUB) 4 is "1" or "0". The results of the detection 7 of the DET 6 are sequentially input to the shift register 53 of the FBF 8. The RAM 54 outputs a value to be next corrected next. The DFE 14 sequentially iterates this operation.

The main structural elements of the DFE 14 of FIG. 4 will be described in detail next. The 3-tapped linear equalizer (FFF) 2 includes a transversal equalizer composed of data latches (DLS) 49, multipliers (MULS) 50 and a summing unit 51. The FBF 8 is composed of the 8-bit shift register (SR) 53, and RAM 54 having 256 addresses of 8-bit data 61 from the SR 53 as address values. A learning control unit (LC) 90 and a pattern memory (PM) 91 use a coefficient value of the multipliers 50 and memory values in RAM 54 for training purposes when an optical disk is set in the optical disk device. More particularly, when a learning mode is designated by an equalizer constant setting signal CONT 62, the learning control unit 90 determines a coefficient value 55 and a memory value 54 such that the difference between a reference pattern in the pattern memory 91 and a signal 5 as the result of equalization of a reproduced signal on the basis of a reference pattern stored in a training track is minimized. Alternatively, the learning control unit 90 may provide sequential control such that the difference 63 between as a signal 7 indicative of the reference pattern in the pattern memory 91 and the signal 5 as the result of the equalization is minimized. If the error rate based on the initial values of the memory 55 and the RAM 54 is expected to be about 1E-4, the result of the detection of the detector 6 may be used in place of the pattern memory 91.

When another area in the same disk is to be read, the coefficient value 55 and the memory value 54 are switched to values suitable for that area by CONT 62.

Figure 10:
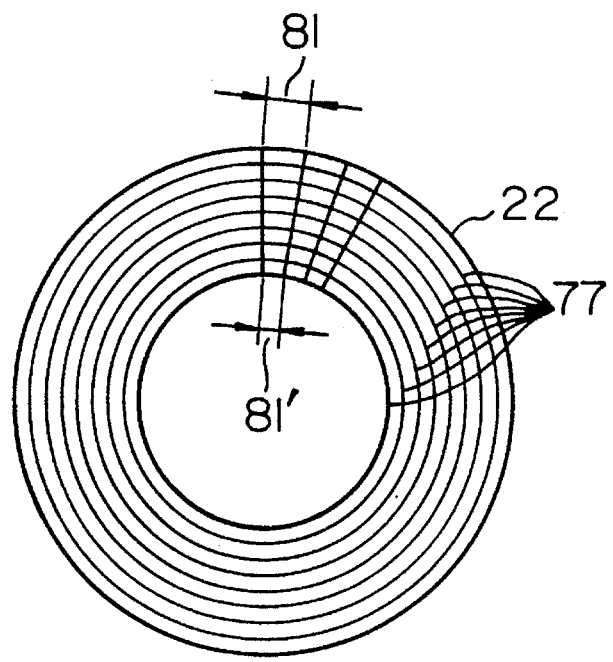
FIG. 10 shows the recorded state of a disk surface of the first embodiment.

FIG. 10 shows the layout of training tracks 77 on the disk. The optical disk device of this embodiment has a recording format of a constant rotational angle type. Therefore, the sector width 81 of the outermost periphery of the disk is larger than the sector width 82 of the innermost periphery of the disk. A storage area including many tracks on the disk 22 is divided into a plurality of blocks in dependence on the magnitude of track radius. Although only 8 area blocks are shown in FIG. 10, they each are actually further divided by 4. A training track 77 is allocated to each of the 32 area blocks. A training pattern recorded on the training track 77 is the same as a reference pattern in the pattern memory 91. This pattern is obtained by passing random user data through the modulation system of the device. When the result of the detection by the detector 6 is used in place of the output signal from the pattern memory 91 as in the above case, those limitations may be omitted.

When a disk 22 is set in the device, training is made at each of the positions of the allocated training tracks and the result of the training is recorded in a set of 32 tap coefficient setting memories (MEMS) 55 of the FFF 2 and a set of 32 RAMS 54 of the FBF. A training track 77 for each area is disposed in the innermost periphery of that area. When a disk 22 is set in the device, the time required for training the 32 coefficient setting MEMS 55 of FFF 2 and the 32 RAMS 54 of the FBF 8 is several seconds at most. When the user data is reproduced, one coefficient setting MEM 55 of the FFF 2 and one RAM 54 of the FBF 8 obtained beforehand by training in accordance with an equalizer constant setting signal (CONT) is applied to 256 tracks present in one area. Thus, in the present embodiment a total of 8192 tracks is realized.

While the training track 77 is disposed in the innermost periphery of each area, it is obvious that it may be set at any position and a plurality of training tracks 77 may be set in any area of the disk. The same coefficient set and RAM content are not applied to all the tracks present in one region, but a coefficient value used may be corrected appropriately in dependence on the position of a track in the area.

At this time, a variable gain amplifier (VGA) control unit (VGAC) 46 controls the VGA 43, using the different signal 63 between the detected data 7 and an undetected signal 5 while a voltage controlled oscillator control unit (VCOC) 48 controls a voltage controlled oscillator (VCO) 47. The structure and operation of the control units 46 and 48 are explained in detail in "Application of Digital Signal Processing", Pages 169–170, Institute of Electronics, Information and Communication Engineers of Japan, and further description thereof will be omitted.

The multipliers 50 used in the FFF 2 of the decision feedback equalizer (DFE) 14 may be composed of a look-up table (LUT) which looks up the contents of the memory which stores the result of the multiplication beforehand. The low pass filter (LPF) 44 may be peaked at a particular frequency. The 32 tap coefficient setting MEMS 55 and the 32 RAMS 54 may be provided separately from the DFE 14 such that one of the MEMS 55 and one of the RAMS 55 may be selected in dependence on the position of a track to be read. Alternatively, one tap coefficient register and one RAM 54 alone may be provided in the DFE 14 such that the contents of the 32 tap coefficient setting MEMS 55 and the 32 RAMS 54 may be set again in dependence on the respective positions of tracks to be reproduced.

Figure 5:
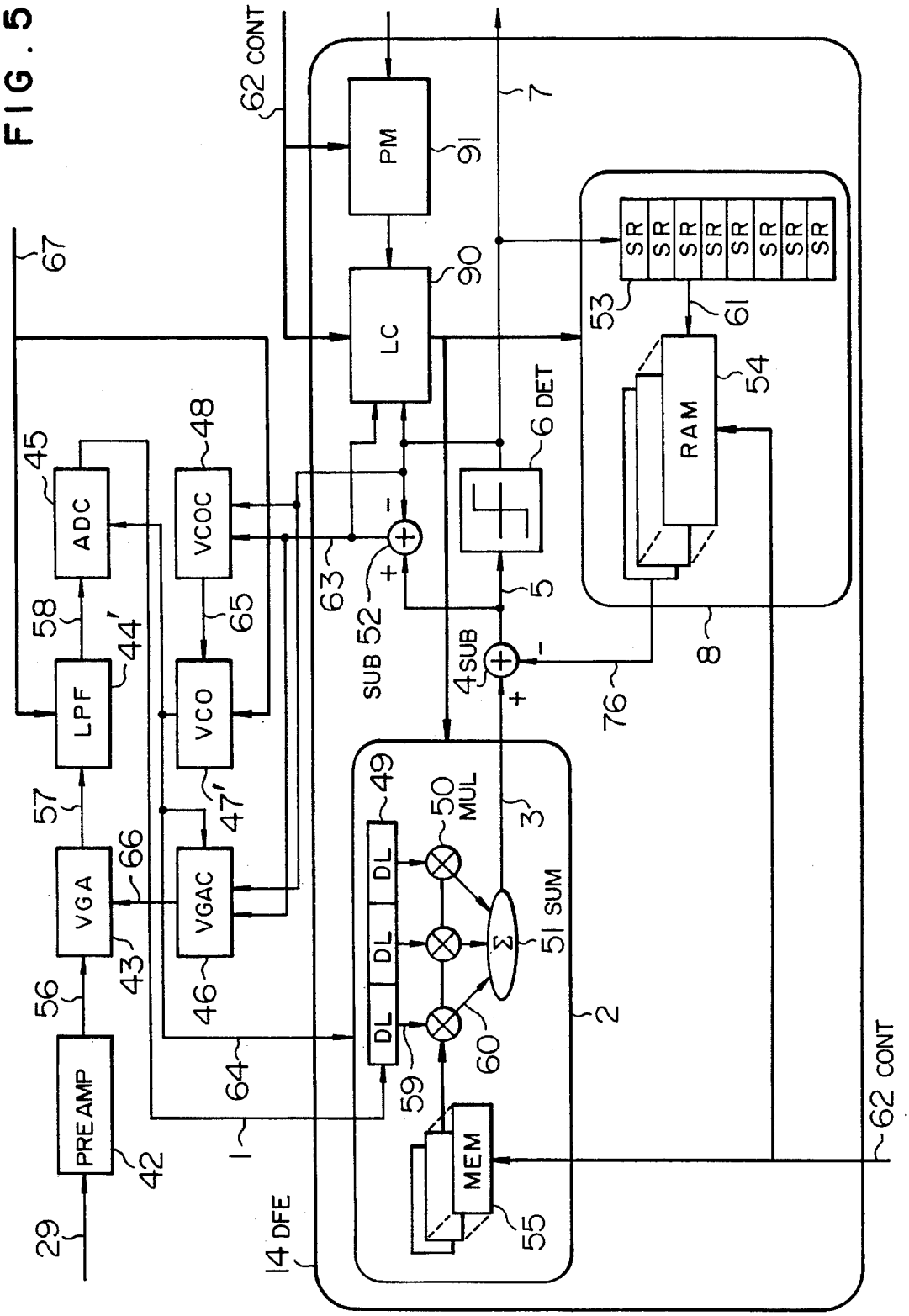
FIG. 5 shows the structure of a read signal processor of the second embodiment.
Figure 6:
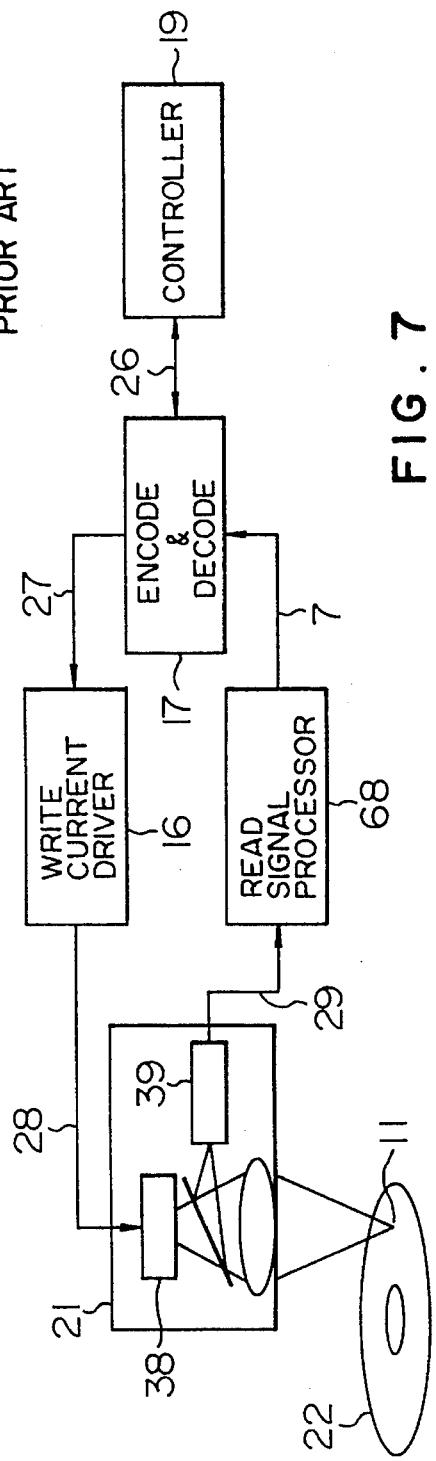
FIG. 6 shows the recording/reproducing system of a conventional optical disk device.
Figure 7:
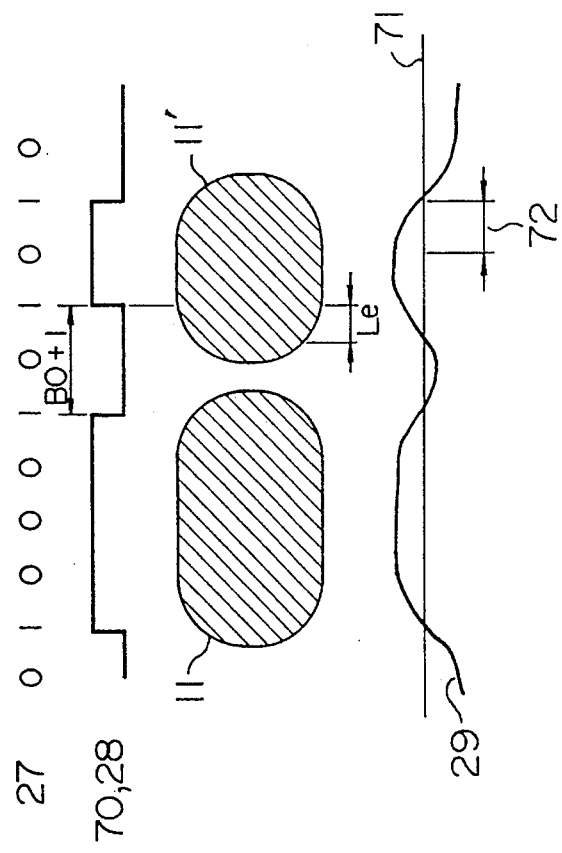
FIG. 7 shows a mark recorded by the optical disk device and the output waveform of the photodetector.
Figure 8:
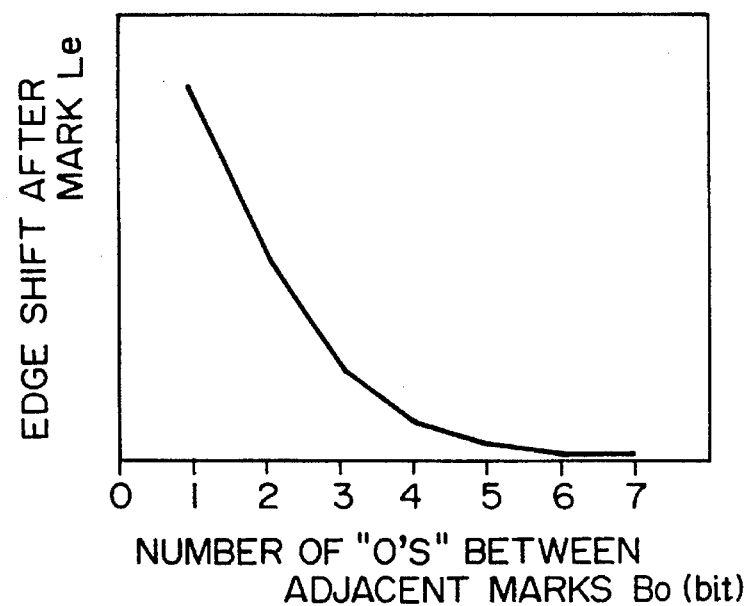
FIG. 8 shows the relationship between an edge shift quantity and the number of "0's" between adjacent marks.
Figure 9:
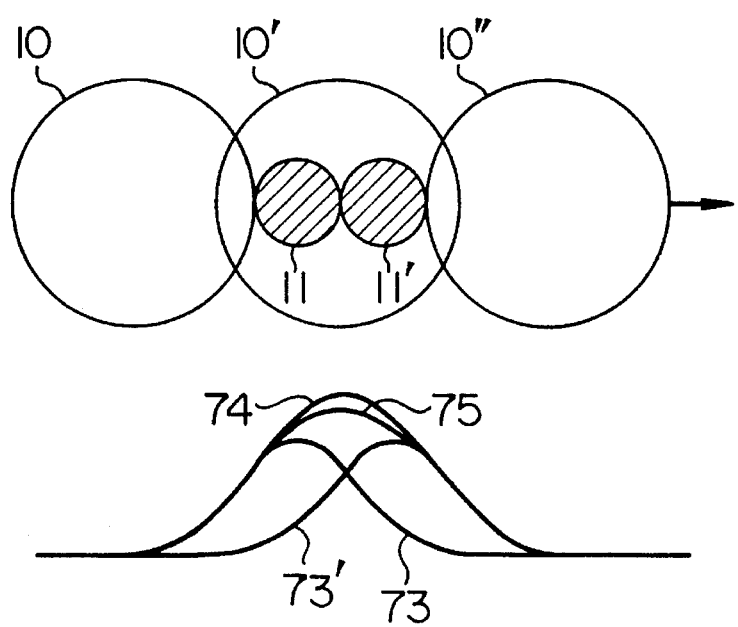
FIG. 9 illustrates a non-linear distortion which can be generated in the photodetector.
Figure 11:
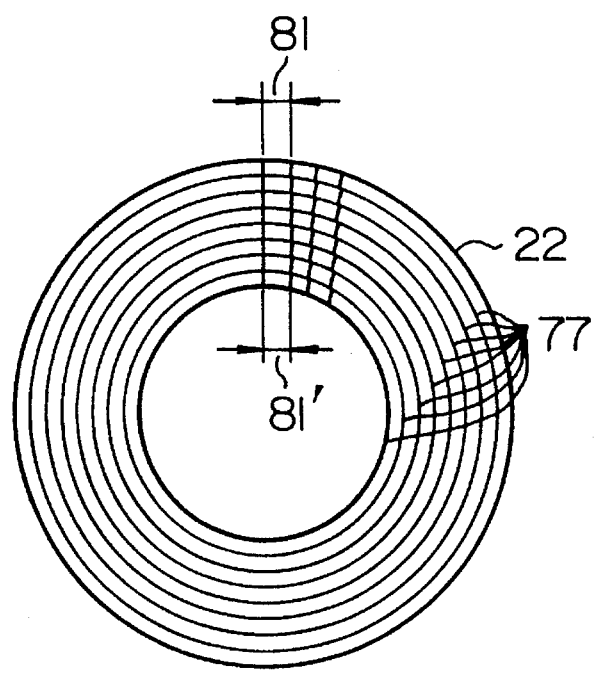
FIG. 11 shows the recorded state of a disk surface of the second embodiment.

A second embodiment of the embodiment of the present invention will be described with reference to FIGS. 3, 5 and 11. The second embodiment is a system in which the difference between the line recording densities in the inner and outer peripheral regions of a disk is alleviated, in more detail, application of the DFE 14 having the FIG. 1 structure to an optical disk device of a modified CAV system. FIG. 11 shows the layout of tracks on a disk surface. The recording region of the disk 22 is divided into 8 sections in dependence on the size of track radius. A recording/reproducing frequency used in the outer sections is higher than that in the inner sections such that the outermost sector width 81 is substantially equal to the sector width 81' of the innermost periphery to thereby reduce the difference between the line recording densities. At least one training track 77 is allocated to each section.

The whole device structure of the second embodiment is the same as that of FIG. 3 except that the second embodiment has the function of changing the recording/reproducing frequency in dependence on the position of the optical head 21. Thus, the read signal processor will be described with reference to FIG. 5. Most of the respective blocks of the read signal processor 68 are the same as those of FIG. 4. Thus, in FIGS. 4 and 5, the same block is identified by the same reference numeral. The read signal processor of FIG. 5 is different from that of FIG. 4 in that the central frequency of the VCO 47' and the cut-off frequency of the LPF 44' each are changed to respective eight different ones in accordance with a control signal 67 to thereby use a recording/reproducing frequency varying in dependence on each section. Since there are eight sections, eight coefficient setting MEMS 55 of the FFF 2 and eight RAMS 54 of the FBF 8 are used. FIGS. 4 and 5 are the same in that when an optical disk 22 is set in the optical disk device, training is made by reading a training track and the respective read values are set in the coefficient setting MEMS 55 and the RAMS 54. When user data is reproduced, the recording/reproducing frequency is changed and the equalizer constants of the FFF 2 and FBF 8 are changed in accordance with the equalizer constant setting signal for each block. The equalization of the leading edge of the reproduced waveform and correction of an error involved in its trailing edge as in the embodiment of FIG. 4 are then performed.

As in the first embodiment, let the respective dimensions of the optical disk device be: The disc rotational speed N is 1800 (rpm); the disk size (diameter) D is 3.5 (inches); the modulation system is a (1,7) RLL code (Rate=$\frac{2}{3}$); the user data transfer rate Bps is 1 (Mbytes/sec); the wavelength L$\lambda$ of a laser 38 used for reproduction is 0.72 ($\mu$m); the aperture number Na of the objective 40 is 0.5; and the data area ratio d of the disk 22 (d=the innermost peripheral track position/ the outermost peripheral track position) is 0.5. Rm ( ); Rs (the diameter of a reproduced spot of the laser); and T (the interval of time involving a data row to be recorded) are calculated as:

$$Rm = 3.5 \times 0.5 \times 0.0254/2 \ (m) = 2.22 \ (cm),$$

$$Rs = 0.82 \times 0.72/0.5 \ (\mu m) = 1.181 \ (\mu m),$$

and $$T = 2/3/1/8 \ (\mu sec) = 83.3 \ (\mu sec).$$

Thus, the minimum number of taps Nf of the FFF 2 is:

$$\begin{aligned} Nf &= INT\{(1+1)/2 + 1.81e(-6)/4\pi \times 2.22e(-2) \times \\ &\quad 1800 \times 60 \times 83.3e(-9)) + 1\}(\text{taps}) \\ &= INT\{1 + 1.694 + 1\} = 3 \ (\text{taps}). \end{aligned}$$

Since Ns ( ) and Nh ( ) are calculated as:

$$Ns = 7+1 = 8 \ (\text{taps}),$$

and $$Nh = INT\{1.181e(-6)/(2\pi \times 2.22e(-2) \times 1800 \times 60 \times 83.3e(-9)) + 1\}(\text{taps}) = INT\{3.39+1\} = 4,$$

the minimum number of taps Nb of the FBF 8 is:

$$Nb = Max \ (Ns, Nh) = 8 \ (\text{taps})$$

Those values are exactly the same as those of FIG. 1. As shown in the first embodiment, when those dimensions are applied to an optical disk device dedicated to reproduction such as a CD-ROM, non-linear distortions in the recording process is reduced as mentioned above, so that Nb=4 may be employed. Also, in this embodiment, a high-performance reading system is constructed in areas Nf and Nb such as is shown in FIG. 14. For area A is an usable area for a device where non-linear distribution is large in a recording process. For area B is an usable area for a device where non-linear distribution is small in a recording process (for example, CD-ROM).

The reason why the number of training tracks 77 in the present embodiment is reduced to ¼ of that of the first embodiment is that a change in the detected waveform 29 is small since the line recording densities in the inner and outer peripheral regions of the disk 22 are substantially constant. The difference between the tap coefficient MEMS 55 in the inner and outer peripheries of the FFF 2 is very small. According to the present embodiment, since the storage capacity per track in the innermost peripheral region is about twice that in the outermost peripheral region, the storage capacity of one disk increases by about 30–40 percent compared to the first embodiment. In addition, the time required for the training is advantageously shorter than that in the first embodiment.

Figure 12:
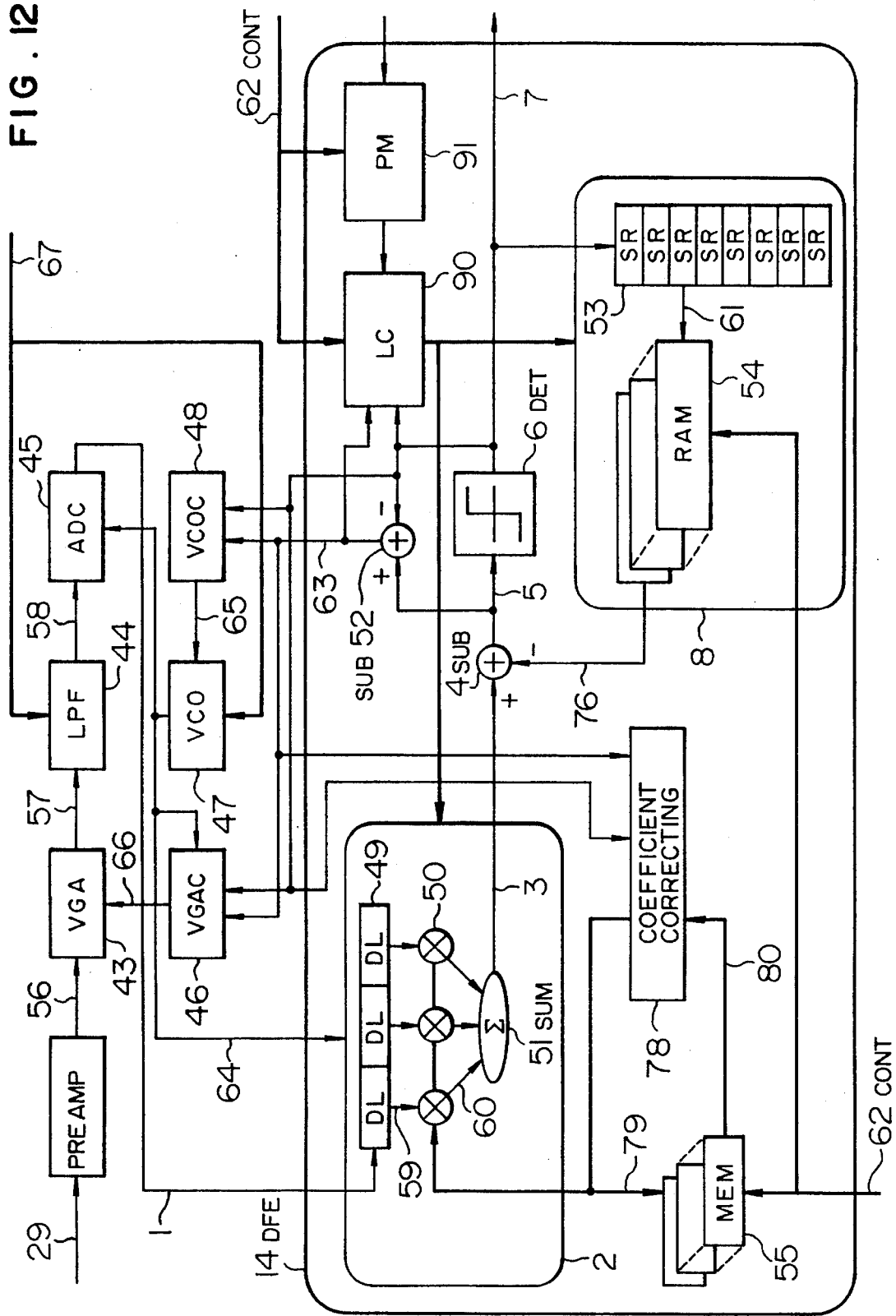
FIG. 12 shows the structure of a read signal processor of a further embodiment of the present invention.

A third embodiment of the present invention will be described next with reference to FIG. 12. The third embodiment is substantially similar to the second one in that the optical disk device of a modified CAV type which achieves a substantially constant line recording density uses the DFE 14 of FIG. 1 according to the present invention.

The third embodiment is different from the second one in that the former includes a combination of a coefficient correcting circuit 78 and the structure of the second embodiment. In the third embodiment, coefficient data 79 in the FFF 2 of the DFE 14 is corrected adaptively with an equalization error 63 and a detector output signal 7 while the user data is being reproduced, and the contents of the tap coefficient setting memories 55 are updated with the result of the correction. The initial value of the tap coefficient setting MEMS 55 when a disk is set includes the result of the training using the training track 77 as in the second embodiment.

According to the third embodiment, the characteristic of the FFF 2 is equalized with high accuracy in each track even in one area. As a result, the recording density is further enhanced compared to the second embodiment.

According to the present invention, an optical disk device in which a possible deterioration in the read signal produced by non-linearity in the recording and reproducing processes is equalized with high accuracy and at high efficiency and compatibility of disks is high, and an optical disk medium suitable for the present optical disk device are provided.

What is claimed is:

1. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein said non-linear equalizing means includes a detector for detecting a signal on the basis of the output of said linear equalizer, the output of said detector being input to said decision feedback equalizer, the output of which is input to said detector along with the output of said linear equalizer in an additive manner;

wherein said decision feedback equalizer comprises a random access memory, data in which is output; and further comprising learning control means for setting an equalizing characteristic of said non-linear equalizing means, said learning control means setting an equalizer coefficient in said linear equalizer and a memory value in the random access memory of said decision feedback equalizer.

2. An optical disk device according to claim 1, wherein a data transfer rate is constant through the radius of the optical disk.

3. An optical disk device according to claim 1, comprising a write current driver for generating a write signal depending on desired data; a light source for emitting light modulated in accordance with a signal from said write current driver; an optical system for irradiating light from said light source on a recording medium; and the function of writing data.

4. An optical disk device according to claim 1, wherein said decision feedback equalizer provides an output corresponding to an output pattern from said detector.

5. An optical disk device according to claim 4, wherein said decision feedback equalizer comprises a shift register for storing a binary signal from said detector; and a plurality of random access memories, data in that of said plurality of random access memories corresponding to a value in said shift register being output.

6. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein said linear equalizer comprises a transversal equalizer which operates at a symbol rate and wherein the number of taps $Nf$ of said transversal equalizer is given by:

$Nf \geq$ (1 + the minimum number of successive bits "0's" determined by a modulation system)/2 + a reproduced spot diameter of a laser beam/a minimum bit length determined by a modulation system/2 ($Nf$ is a positive integer).

7. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein a register length $Nb$ of said decision feedback equalizer is given by:

$Nb \geq$ a reproduced spot diameter/the shortest bit length determined by a modulation system ($Nb$ is a positive integer).

8. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein a register length $Nb$ of said decision feedback equalizer is given by:

$Nb \geq$ 1 + the maximum length of the number of bits between adjacent marks determined by a modulation system ($Nb$ is a positive integer).

9. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein a number of taps Nf of a transversal equalizer is given by:

$Nf \geq (Bm+1)/2 + (0.82\ L\lambda/Na)/(2\ \pi \times D \times d \times 0.0254 \times N \times Rate/Bps/8)$ ($Nf$ is a positive integer)

where N is the disk rotational speed (rps), D is the disk size (diameter) (inches), Bps (bytes/secs) is a data transfer rate; $L\lambda$ (m) is the laser wavelength used for reproduction; Na is the aperture number of an objective of an optical system; d is a data area ratio of a disk (d=the innermost peripheral track position/the outermost peripheral track position); Bm (bits) is the minimum number of successive bits "0's" in a modulation system; and Rate is a modulation rate.

10. An optical disk device according to claim 9, wherein a register length Nb of said decision feedback equalizer is given by:

$Nb \geq$ 1 + the maximum length of the number of bits between adjacent marks determined by a modulation system ($Nb$ is a positive integer).

11. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein said non-linear equalizing means includes a linear equalizer and a decision feedback equalizer provided after said linear equalizer;

wherein a register length Nb of said decision feedback equalizer is given by:

$Nb \geq (0.82\ L\lambda/Na)/(\pi \times D \times d \times 0.0254 \times N \times Rate/Bps/8)$ ($Nf$ is a positive integer)

where N is the disk rotational speed (rps), D is the disk size (diameter) (inches), Bps (bytes/secs) is a data transfer rate; $L\lambda$ (m) is the laser wavelength used for reproduction; Na is the aperture number of an objective of an optical system; d is a data area ratio of a disk (d=the innermost peripheral track position/the outermost peripheral track position); Bm (bits) is the minimum number of successive bits "0's" in a modulation system; and Rate is a modulation rate.

12. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

further comprising a number of learning tracks having information to be reproduced to determine the characteristic of said nonlinear equalizing means being provided at a plurality of positions through a radius of the disk.

13. An optical disk device which uses a light spot for reproducing data, comprising:

photodetection means;

decoding means; and non-linear equalizing means provided between said photodetection means and said decoding means for correcting non-linear distortions in a reproduced signal from an optical disk;

wherein a number of tracks through a radius of the optical disk is divided by a positive integer such that a line recording density is substantially constant at respective track positions of the tracks.

* * * * *